United States Patent Office 2,803,254
Patented Aug. 20, 1957

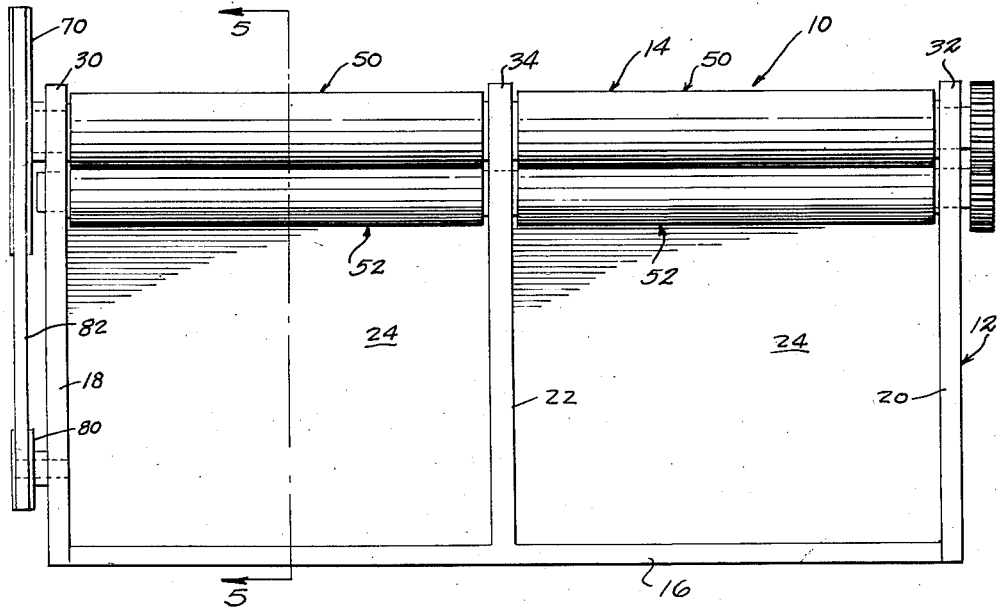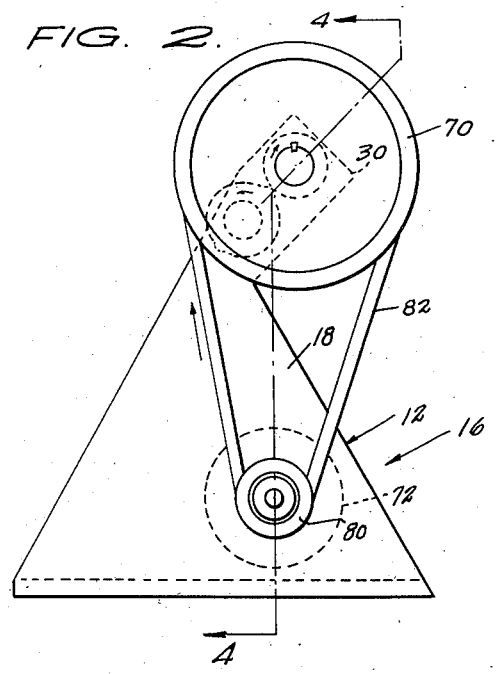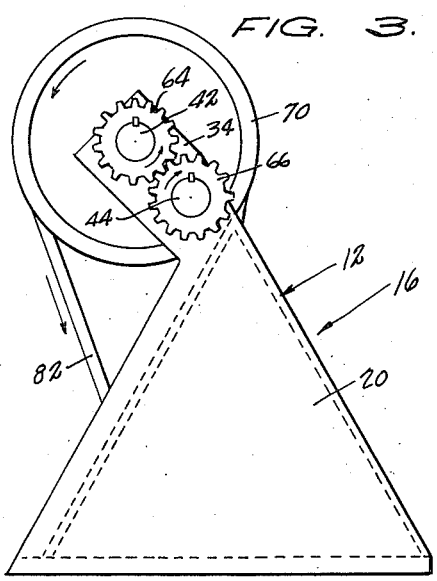

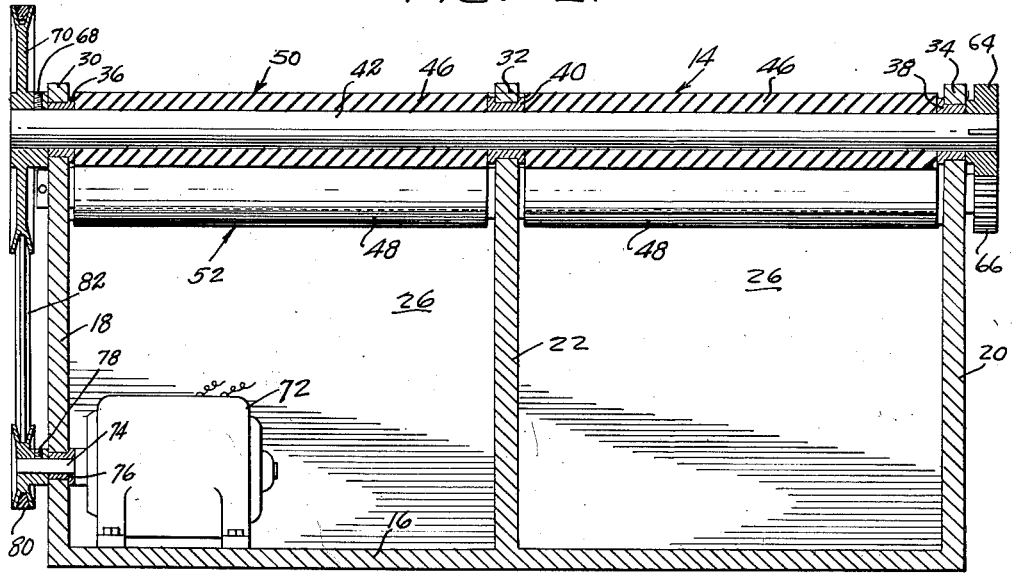
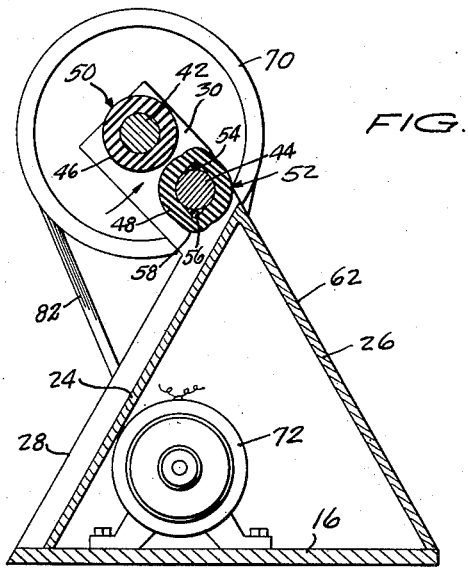

2,803,254
PEA SHELLING APPARATUS
Fairley Elonzo Wood, Houston, Tex.
Application January 27, 1956, Serial No. 561,718
1 Claim. (Cl. 130—30)

This invention relates generally to shelling apparatus for green peas and the like, is more particularly concerned with novel shelling apparatus for readily and expeditiously separating edible vegetables from the hulls or pods in which they are disposed with a minimum of damage to said edible portions.

A primary object of invention in conformance with that set forth is to provide a shelling apparatus including a triangular prism shaped support member having diverging side panels for separating the edible vegetable portions from the hulls, said support member including a pair of vertically spaced staggered roller members overlying one of the panels and being synchronously rotatable in opposite directions, one of the roller members including longitudinally extending peripheral rib means extending the length thereof toward the other roller member whereby shelled edible vegetable portions are deposited on the side panel portion over which the roller members overlie and the hulls thereof are deposited on the other side panel.

A further object of invention in conformance with that set forth is to provide a shelling apparatus of the character set forth which is readily and economically manufactured, easily used and maintained, and highly serviceable, practical and satisfactory for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view of the novel shelling apparatus;

Figure 2 is a side elevational view of the novel shelling apparatus looking from left to right in Figure 1;

Figure 3 is a side elevational view of the novel shelling apparatus looking from right to left in Figure 1;

Figure 4 is a sectional view taken substantially on line 4—4 of Figure 2; and

Figure 5 is a sectional view taken substantially on line 5—5 of Figure 1.

Referring to the drawings, the novel shelling apparatus is indicated generally at 10 and includes a support member indicated generally at 12 and a separating roller assembly indicated generally at 14.

The support member 12 has a triangular prism shaped configuration and includes a base member 16, triangular end members 18 and 20 and an intermediate vertical support member 22 which has a triangular configuration similar to the end members 18 and 20. The members 18, 20 and 22 are covered by panel members 24 and 26, see Figure 5, thus defining diverging side panel portions, the side panel portions 24, as subsequently will become apparent, serving to dispose the edible vegetable portion such as the hulled peas on one side of the support member, side panel portion 26 thereof serving to dispose the hulls of said peas on the other side of the support member. The side panels 24, as seen in Figure 5, may be disposed inwardly from the edge 28 of members 18, 20 and 22 for providing a trough for guiding the shelled peas, for example, into a suitable hopper.

The end members 18 and 20 and the intermediate member 22 each terminate at their upper ends in oppositely disposed mutually parallel angular support elements 30, 32 and 34, respectively, which overlying the side panels 24 and may incorporate therein suitable shaft supporting bushing elements, of bronze, for example, indicated at 36, 38 and 40, respectively, see Figure 4, for a purpose that will subsequently become apparent. Roller support shafts 42 and 44, respectively, are journaled in transverse vertically extending staggered relationship in the bushing portions of the aforementioned elements 36, 38 and 40 and have concentrically disposed thereon a resilient covering 46 and 48, respectively, of rubber, plastic or any other suitable material, said shafts and coverings defining roller members indicated generally at 50 and 52 having a substantially circular cross section. Considering Figure 5, the roller member 52 has extending longitudinally along the outer periphery of the shaft 44 in engagement with the inner periphery of the casing 48 a pair of diametrically opposed rod elements 54 and 56 which define in the outer periphery of the roller 52 a pair of diametrically opposed rib portions 58 and 60 extending along the length of the roller member 52.

Inasmuch as this embodiment of the invention is disclosed with the support member 22 therein it will be noted that there are pairs of adjacent upper and lower roller assemblies, however, inasmuch as the apparatus functions in the exact same manner if there were but a single roller, this device will be described and identified wherein the roller members will be considered to be a single member.

It will be noted that the outer periphery of the roller member 52, see Figure 5, intersects a plane passing through the outer surface portion 62 of the side panels 26 and thus when the hulls or pods of peas being shelled are engaged by the ribs 58 or 60 they will be urged over the outer periphery of the lower roller 52 and under the surface 62 for disposal on the side of the support member opposite the panels 24. The peas being hulled falling from the rollers will drop onto the side panel 24 and be deposited as previously explained.

The shafts 42 and 44 have suitably keyed on adjacent end portions interengaged gear members 64 and 66, see Figures 3 and 4, whereby rotation of the roller members 52 and 50 is simultaneous and synchronized. As indicated by the direction arrows in Figures 2 and 3, the shafts or rollers are rotated in an opposite direction toward the side panels 26 whereby peas or the like are inserted as indicated by the direction arrow in Figure 5 resulting in the same being hulled by the rollers.

The shaft 42 has suitably secured by means of a set screw 68 the hub of a pulley member 70, and disposed within the support member 12 is a suitable power source 72, such as an electrical motor, said motor including a power shaft 74 extending laterally therefrom within suitable bearing journal portion 76 in the end wall 18, said power shaft 74 having suitably secured thereon by means of a set screw 78 driving pulley member 80 which is in planar alignment with the pulley 70. A conventional flexible drive belt 82 journaled about the pulleys 70 and 80 whereby rotation of the pulley 70 by the pulley 80 results in synchronized rotation of the roller members 50 and 52.

Although it has been indicated that an electric motor may be utilized for operating the device, it is to be understood that the apparatus may be operated manually, by means of an internal combustion engine, or in any other suitable manner.

Thus there has been disclosed a shelling apparatus which fully conforms with the objects of invention heretofore set forth.

Various positional directional terms such as "side," "bottom," "lower," etc. utilized herein to have only a relative connotation to aid in describing the device is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed is:

A shelling apparatus for green peas and the like comprising a triangular prism shaped support member including diverging side panels defining a linear upper apex portion, oppositely disposed mutually parallel support elements extending angularly from the linear apex portion of the support member in overlying relationship to one of the side panels, upper and lower spaced roller members journaled in vertically staggered transverse spaced relationship between said support elements in overlying relationship to said side panel, power means rotating said roller members in an opposite direction away from the panel over which said roller members overlie, said roller members being of a resilient material and having a circular cross section, one of said roller members including a pair of diametrically opposed rib portions extending longitudinally along the outer periphery thereof and longitudinally engaging the outer periphery of the other roller member whereby unhulled peas inserted between the roller members results in the hulled vegetables falling on the one side panel over which the rollers overlie and the hulls being engaged by the rib portions and disposed on the other side panel, the one roller member having the diametrically opposed rib portions comprising a shaft member having a resilient tubular casing circumposed thereon, and a pair of elongated rod elements interposed between the outer periphery of the shaft member and the inner periphery of the casing whereby said rib portions substantially contact the outer periphery of the other roller member.

References Cited in the file of this patent
UNITED STATES PATENTS

| | | |
|---|---|---|
| 20,925 | Richardson | July 13, 1858 |
| 437,987 | Harbin | Oct. 7, 1890 |
| 2,182,769 | Hawkins | Dec. 19, 1939 |